(12) United States Patent
Cleaver et al.

(10) Patent No.: US 7,994,235 B2
(45) Date of Patent: Aug. 9, 2011

(54) METHOD OF MAKING MODELS

(75) Inventors: Matthew Cleaver, Haverhill (GB); Didier Arnoux, Paris (FR)

(73) Assignee: Huntsman Advanced Materials Americas LLC, The Woodlands, TX (US)

(*) Notice: Subject to any disclaimer, the term of this patent is extended or adjusted under 35 U.S.C. 154(b) by 0 days.

(21) Appl. No.: 12/722,246

(22) Filed: Mar. 11, 2010

(65) Prior Publication Data

US 2010/0164134 A1  Jul. 1, 2010

Related U.S. Application Data

(63) Continuation of application No. 10/498,692, filed as application No. PCT/GB02/05652 on Dec. 13, 2002, now Pat. No. 7,704,424.

(30) Foreign Application Priority Data

Dec. 14, 2001 (GB) .................................. 0129986.6

(51) Int. Cl.
*C08J 9/32* (2006.01)
(52) U.S. Cl. ...................................... 523/218
(58) Field of Classification Search .................. 523/218
See application file for complete search history.

(56) References Cited

U.S. PATENT DOCUMENTS

| | | | |
|---|---|---|---|
| 4,916,173 A | 4/1990 | Otloski et al. | |
| 5,050,776 A | 9/1991 | Rosenplanter | |
| 5,128,433 A | 7/1992 | LeCompte et al. | |
| 5,204,439 A | 4/1993 | Dormish et al. | |
| 5,707,477 A | 1/1998 | Cloud | |
| 5,760,105 A | 6/1998 | Okada et al. | |
| 5,773,047 A | 6/1998 | Cloud | |
| 6,020,387 A * | 2/2000 | Downey et al. | 521/57 |
| 6,060,540 A | 5/2000 | Wanthal et al. | |
| 6,077,886 A | 6/2000 | Hayes et al. | |
| 6,121,348 A | 9/2000 | White | |
| 6,348,513 B1 | 2/2002 | Hilborn et al. | |
| 2004/0013865 A1 | 1/2004 | Kotnis et al. | |

FOREIGN PATENT DOCUMENTS

| | | |
|---|---|---|
| DE | 29821404 | 4/1999 |
| WO | WO 02/20261 | 3/2002 |

* cited by examiner

*Primary Examiner* — Edward J Cain
(74) *Attorney, Agent, or Firm* — Robert Holthus

(57) ABSTRACT

A method of a seamless model free of bond lines. The method includes the sequential steps of providing a substructure having an exposed outer surface, applying a modelling paste to a structure support in the form of a continuous layer, curing the applied modelling paste, and machining the cured layer of modelling paste to the desired contour. The modelling paste a low density curable composition prepared from thixotropic epoxy or polyurethane containing microballoons.

12 Claims, 1 Drawing Sheet

METHOD OF MAKING MODELS

CROSS REFERENCES TO RELATED APPLICATIONS

Figure 1:
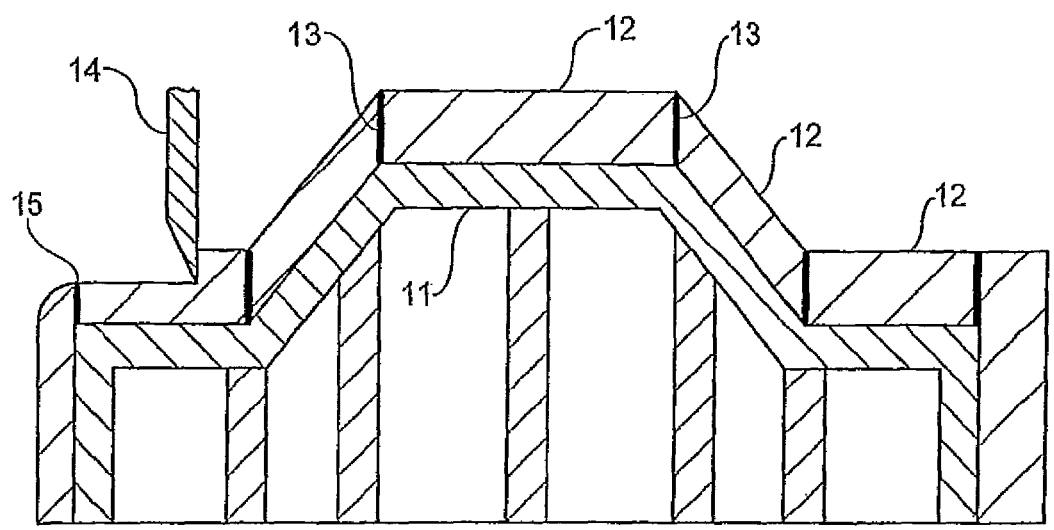

This application is a continuation application of U.S. patent application Ser. No. 10/498,692, pending, which is the National Phase of International Application PCT GB/03/05652 filed Dec. 13, 2002 which designated the U.S. and was published in English and which claims priority to G.B. Pat. App. No. 0129986.6 filed Dec. 14, 2001. The noted applications are incorporated herein by reference.

TECHNICAL FIELD

The present invention is concerned with a method of making a model using a curable modelling paste and with models made using the method.

BACKGROUND ART

In the transport industries (for example, the automotive, rail and aerospace industries), it is common practice to produce large, dimensionally accurate master models. These models are used by engineers for the conceptual design of individual component parts of the final product.

A known method involves a "building block" approach in which several boards are glued together to produce a rough model structure and this is then machined to form the desired shape. This approach, however, is labour intensive and requires precision operations, leading to high cost, and moreover results in a model which has bondlines at the surface, an appearance which is aesthetically undesirable.

There is thus a need in the industry for a model and method of making a model which are characterised by low cost and a smooth seamless surface free of bondlines. U.S. Pat. Nos. 5,707,477 and 5,773,047 describe a method for making prepreg parts for use in the aerospace industry where pliable solid patties prepared from syntactic epoxy material are hand-applied to a block made by stacking successive layers of aluminium honeycomb core. The entire resulting structure is then heated to effect cure of the patties. However, this approach is again labour intensive, in that it involves hand application of the pliable solid patties to the honeycomb core. It also requires heating of the entire structure in order to cure the applied patties. The resulting models are also of relatively high density.

Thus, there still remains a need for a model and a method of producing models, where the model is characterised by lower production costs, lower weight and a more uniform surface having improved smoothness and free of bondlines. Easy hand cutting and modelling, combined with machine (lathe or other forms) cuttability are desired attributes. More generally there is also such a need for a readily cuttable smooth material in application areas where wood or clay are used as modelling material, particularly where a durable surface is required which is more light weight and easier to paint.

DISCLOSURE OF INVENTION

According to the present invention, there is provided a method of making a model which comprises the steps of: applying a modelling paste to a support; curing the paste; and machining the cured paste to a desired or pre-determined contour; in which the modelling paste is a low density thixotropic curable paste comprising a resin composition and microballoons, the microballoons representing 50% of 80% of the uncured paste by volume, and the density of the uncured paste being in the range of 0.4 to 0.9 g/cm$^3$.

Preferably, the resin composition is a polyurethane composition and comprises an organic polyisocyanate component; a polyol component comprising greater than 50% by weight of a high molecular weight polyol and less than 50% by weight of a low molecular weight polyol, and a chemical thixotropic agent in an amount sufficient to induce thixotropic properties.

Alternatively, the resin composition comprises an epoxy resin; a thixotropic agent in an amount sufficient to induce thixotropic properties; and a hardener comprising at least one polyethyleneimine and at least one other amine having at least two amine hydrogen groups, the combined amounts of the two amines being sufficient to effect cure of the epoxy resin.

The use of hybrid systems is very important, eg. a fast reacting component [eg. Michael Addition] combined with slower epoxy reacting system. This combination has been found extremely useful in controlling the heat produced during the reaction experienced in curable compositions containing high volume content of air either in the form of foam or microballoons.

It has been found surprisingly that certain mixtures of microballoons and low density inorganic particulate fillers in curable resins yield uniform, easily dispensible compositions which cure evenly without cracking and defects, so that the formed cured material can be easily hand cut or machined to form the final model. A high volume content of the microballoons is used to produce the final low density in the cured material. It is important that the pastes are able to develop instantaneous thixotropy after application, so that flow is controlled. Fabrication of low density flowable pastes which develop such thixotropic attributes on application are particularly difficult, as slumping occurs very readily. Furthermore, the low density is achieved through use of a high volume of microballoons: this poses a significant difficulty in achieving machine dispensable formulations to form very closed, fine even morphology, without breakage of the fragile microballoons during the machine pumping action. However, this is achieved in the present invention and indeed, easy hand and machine cutting of cured material is attained to such a degree that the cut portions can be removed as ribbons without a great deal of dust formation.

Thus, the present invention provides a method of making a seamless model free of bond lines and includes the sequential steps of providing a substructure having an exposed outer surface, applying a modelling paste to the outer surface of the substructure in the form of a continuous layer, curing the continuous layer of applied modelling paste, and machining or hand cutting said cured layer of modelling paste to the desired contour. This method is referred to as "net size casting" using a "seamless modelling paste" (SMP). This technique is used commercially, but with dense pastes.

The present invention is characterised in that the modelling paste used is a machine dispensable low density curable mixture containing a resin composition and a filler mixture of micro-balloons and inorganic particles such that the microballoons form preferably 50-70% by volume of the resultant cured paste.

The undersized support structures used in accordance with the present invention, and the methods of making these structures, may be known in the art and may be of the same type of structure typically produced as a back support for conventional board models. The structure may be used as a core onto which the modelling paste can be applied. Examples of materials from which the support structure is made include, but are not limited to, natural wood and low-density foams made for example from polystyrene, polyurethane or epoxy materials. One examples of such low-density core is Dow HD 3000, a 0.03 density expanded polystyrene.

The resin mixture is preferably a low temperature curable thermoset.

A preferred epoxy-based curable modelling paste composition comprises (1) an epoxy resin; (2) a thixotropic agent in an amount sufficient to induce thixotropic properties; and (3) a hardener comprising (a) at least one polyethyleneimine and (b) at least one other amine having at least two amino hydrogen groups, the combined amounts of (a) and (b) being sufficient to effect cure of the epoxy resin. A particularly preferred system comprises an epoxy-acrylate hybrid system having an acrylate content of 0 to 30% preferably 10-15% based on epoxy resin level.

A preferred polyurethane-based curable modelling paste composition comprises (1) an organic polyisocyanate component; (2) a polyol component comprising (a) greater than 50%, by weight of a high molecular weight polyol and (b) less than 50%, by weight, of a low molecular weight polyol; and (3) a chemical thixotropic agent in an amount sufficient to induce thixotropic properties.

The preferred density of the thixotropic, curable paste of this invention is in the range 0.4 to 0.9 g/cm$^3$, preferably between 0.4-0.6 g/cm$^3$.

Preferably, the layer of modelling paste is dispensed onto the support structure surface with a high-output meter-mix machine in the form of a continuous layer. The paste is preferably applied at a thickness of from about 12.7 m to about 38.1 m (about 0.5 to about 1.5 inch) thick, more preferably at about 19.05 mm (0.75 inch) thick. The paste is then cured.

Cure of the curable resin can be effected in accordance with conventional practice in the particular application. In general, the composition can be allowed to gel (set) at ambient temperature or heated moderately in accordance with conventional practice to accelerate setting. Subsequently, completion of cure may be effected at ambient temperature, moderately elevated temperature or higher temperature as required. Typically, room temperature cure is preferred.

After curing, the resin layer may be machined to the final contour by use of a cutter. Typically, approximately 6.35 mm (0.25 inch) of material is removed during machining. The surfaces may be sealed with a sealant before the model is put into production.

The curable resin composition may be an epoxy resin and is preferably a low density filled epoxy resin. It is required to exhibit good non-slump and sag resistance properties when laid horizontally oriented on a vertical surface. Typically, a minimum sag resistance of a 25.4 mm (one inch) thickness on a vertical surface is required. Usually as the density of the curable mixture is lowered by using low density fillers, the ability to maintain a non-slump quality becomes more difficult. It has been found that the low density made from certain ratio of microballoons to inorganic particles to resin, particularly and surprisingly, yield these properties of low density and non-slump behaviour, when combined with chemical thixotropy activity, e.g. as described in U.S. Pat. No. 6,077,886.

In order to meet the overall requirements for an acceptable cured low density modelling stock, the cured composition should have a heat deflection temperature (HDT) over 40° C., and preferably over 50° C., and a coefficient of thermal expansion (CTE) of less than $80 \times 10^{-6} K^{-1}$ (in/in/° C.) in the −30 to 30° C. range and preferably less than $60 \times 10^{-6} K^{-1}$ (in/in/° C.).

Preferred curable epoxy resin/hardener mixtures are described, for example, in U.S. Pat. No. 6,077,886, and comprise (1) an epoxy resin, (2) a thixotropic agent in an amount sufficient to induce thixotropic properties, and (3) a hardener comprising (a) at least one polyethyleneimine and (b) at least one other amine having at least two amine hydrogen groups, the combined amounts of (3)(a) and (3)(b) being sufficient to effect cure of the epoxy resin.

The epoxy resin (1) may consist of one or more epoxy resins which are themselves liquid or may be a liquid mixture of one or more solid epoxy resins with one or more liquid epoxy resins or may be one or more solid epoxy resins dissolved in a diluent such as any diluent conventionally used in epoxy resin compositions. The epoxy resin may be a polyglycidyl ether of a polyhydric alcohol such as 1,4-butanediol or 1,3-propanediol or, preferably, a polyglycidyl ether of a polyhydric phenol, for example a bisphenol such as bis(4-hydroxyphenyl)methane (bisphenol F) or 2,2-bis-(4-hydroxyphenyl)propane (bisphenol A) or a novolak formed from formaldehyde and a phenol such as phenol itself or a cresol, or a mixture of two or more such polyglycidyl ethers. Polyglycidyl ethers of bisphenol A are especially preferred. The epoxy resin, particularly where it comprises a solid epoxy resin, may contain one or more epoxy-functional diluents, usually monoepoxides, or non-epoxide diluents, such as the monoepoxide and non-epoxide diluents conventionally used in curable epoxy resin compositions.

In the case of hybrid epoxy-ethylenic compositions, the ethylenic compound can be acrylic, styrenic or any material monomeric, oligomeric and polymeric containing unsaturation. Materials of special interest are the acrylate monomers, especially the M cure acrylates available from Sartomer company for modification of epoxy/amine systems. These ethylenic compounds react via a Michael addition reaction with the amine component.

The combination of the high level of microballoons and ethylenically unsaturated compounds in the epoxy resin (1), has the advantage of lowering the exotherm of the epoxy formulation.

The thixotropic agent (2) is preferably a thixotropic agent which, it is believed, relies largely on interparticle hydrogen bonding to achieve its thixotropic effect, especially a hydrophilic fumed silica. The amount of thixotropic agent required to induce thixotropic properties may depend on the nature of the specific epoxy resin and specific thixotropic agent used. This amount is generally from 1 to 20%, preferably from 3 to 15%, by weight based on the weight of the epoxy resin (1).

The polyethyleneimine (3)(a) may have a molecular weight (Mw) from 700 to 1,000,000 or more, preferably from 5000 to 750,000, especially from 25,000 to 750,000, particularly about 750,000. Such polyethyleneimines are commercially available or may be prepared from ethyleneimine by known procedures.

The amount of polyethyleneimine is generally chosen so that the epoxy resin composition of the invention does not flow during a desired time after the formation of the composition. Preferably, the amount of polyethyleneimine is such that the epoxy resin composition does not flow for at least 60 minutes after formation thereof. In certain specific embodiments of the invention, the amount of polyethyleneimine is such that the epoxy resin composition does not flow prior to its gelation, which in some instances requires several hours. The amount of polyethyleneimine needed to impart non-flow properties for a given time can be readily determined by simple experiment. For compositions of the invention containing the especially preferred components (1), (2) and (3) (b) described herein, an amount of polyethyleneimine from 0.2 to 2 parts by weight per 100 parts by weight of the epoxy resin is preferred.

Examples of amines suitable for use as the amine hardener (3)(b) include those aliphatic, cycloaliphatic, aromatic, araliphatic and heterocyclic amines known as hardeners for epoxy resins, including: alkylenediamines such as ethylenediamine or butane-1,4-diamine; polyalkylenepolyamines such as diethylenetriamine, triethylenetetramine, tetraethylenepentamine, dipropylenetriamine or tripropylenetetramine; N-hydroxyalkyl derivatives of polyalkylene polyamines such as N-(hydroxyethyl) diethylenetriamine or mon-N-2-hydroxypropyl derivative of triethylenetetramine; polyoxyalkylenepolyamines such as polyoxyethylene—and polyoxypropylene—diamines and triamines; N,N-dialkylalkylenediamines such as N,N-dimethylpropane-1,3-diamine or N,N-diethylpropane-1,3-diamine; cycloaliphatic amines having an amino or aminoalkyl group attached to the ring, such as 3-aminomethyl-3,5,5-trimethylcyclohexylamine (isophoronediamine); aromatic amines such as bis(4-aminophenyl)methane or, bis(4-aminophenyl)sulphone; amine-terminated adducts of epoxy resins with aliphatic, cycloaliphatic or araliphatic amines as hereinbefore described; N-aminoalkyl-piperazines such as N-(2-aminoethyl)piperazine or N-(3-aminopropyl)piperazine; and polyaminoamides, for example reaction products of polyalkylenepolyamines such as those hereinbefore mentioned with polymerised unsaturated fatty acids, eg. polymerised vegetable oil acids such as dimerised or trimerised linoleic or ricinoleic acids; or a mixture of two or more of such amines.

Aliphatic and cycloaliphatic amine hardeners are usually preferred for use as component (3)(b) of the composition, including N-hydroxyalkyl derivatives of polyalkylene polyamines, particularly a mon-N-2-hydroxypropyl derivative of triethylenetetramine, and mixtures thereof with polyaminoamide reaction products of polyalkylenepolyamines and polymerised vegetable oil acids and the amine functional reaction products of amities and epoxy group containing compounds. The amount of (3)(b) is preferably such that (3)(a) and (3)(b) together provide from about 0.75 to 1.25 amino hydrogen equivalents per 1,2-epoxide equivalent of the epoxy resin (1).

The epoxy resin composition may be formed conveniently by stirring a preformed mixture of (1) and (2) together with a preformed mixture of (3)(a) and (3)(b). The thixotropic agent may also be conveniently present in the hardener mixture.

The curable resin composition may be a polyurethane composition. Examples of suitable curable polyurethane froth-forming mixtures include, but are not limited to, those comprising (1) an organic polyisocyanate component; (2) a polyol component comprising (a) greater than 50%, by weight, of a high molecular weight polyol and (b) less than 50% by weight of a low molecular weight polyol; and (3) a chemical thixotropic agent in an amount sufficient to induce thixotropic properties. Preferably, the low molecular weight polyol (b) is present in an amount of less than 40%, by weight, based on the total weight of the combined polyol component. The polyisocyanate and polyol components are conveniently liquid under ambient temperature and pressure conditions, with the polyisocyanate component having a viscosity in the range of 500-3000 cps and the polyol component having a viscosity of less than 30,000 cps in order to ensure optimal throughput in the mixing and dispensing apparatus. However, both components may have greater viscosity, for example up to 60,000 cps, if proper metering pumps are employed.

Suitable organic polyisocyanates (1) which are useful in the invention include any of those commonly employed in making polyurethane plastics including polyarylisocyanates such as polymethylene polyphenyl isocyanate, 4,4'diphenylmethane diisocyanate and modifications thereof, for example, containing carbodiimide linkages, toluene diisocyanate, phenylindane diisocyanate, aliphatic polyisocyanates such as hexamethylene diisocyanate, isophorone diisocyanate, 2,2,4trimethylhexamethylene diisocyanate, and blends thereof. Polymeric 4,4'-diphenylmethane diisocyanate is preferred.

Suitable high molecular weight polyols (2a) include those having hydroxyl numbers of less than 300, preferably between 100 and 300. Particularly suitable are polyether triols, including aliphatic alkylene glycol polymers having an alkylene unit composed of at lest two carbon atoms. Typical examples are prepared through the polymerization of such alkylene oxides as ethylene oxide, propylene oxide, butylene oxide and tetrahydrofuran, and di- and polyfunctional alcohols such as water, propylene glycol, glycerol, trimethylol propane, hexanetriol, pentaerythritol and sucrose. Applicable materials will generally have molecular weights ranging from 500-7000 preferably between 500 and 1700. A typical polyether triol is available from Olin Corp., under the name POLY-O30-280.

The low molecular weight polyols (2b) include those having hydroxyl numbers of at least 300, preferably between 300 and 1000, and more preferably between 350 and 800. Particularly suitable are amine-based polyols and generally have an equivalent weight of from 30 to 6000 and a viscosity of from 0.001 to 20 PaS (1.0 to 20,000) centripoises at 25 to 60° C. Preferred are those having a molecular weight of between 50 to 400, more preferably, between 200 and 350. A wide variety of aromatic and aliphatic polyamines may form part of the amine-based polyols, such as di- and polyamines including ethylenediamine, triethanolamine and toluenediamine, to be reacted with, for example, the alkylene oxides, noted above. Amine-based triols are preferred. Typical amine-based polyols are available from Texaco Corp., under the designation THANOL SF 265 and from BASF Corp. under the designation PLURACOL 355.

The chemical thixotropic agent (3) imparts chemical thixotropy to the mixture of components (1) and (2) such that sufficient sag resistance is achieved during application of the final paste to the support structure, which is believed to be caused by the formation of adducts from the fast chemical reaction between the isocyanate and amine groups. It is important that chemical thixotropy is induced after mixing, foaming and dispensing onto the substructure as premature chemical thixotropy could lead to gelation in the mixing head. Typical examples of such chemical thixotropic agents are aliphatic, cycloaliphatic, aromatic, araliphatic and heterocyclic amines, including, but not limited to, 4,4'-methylenedianiline, m-phenylenediamine, 4,4'-methylenebis(2-ethylbenezeamine), isophoronediamine and most particularly diethyltoluenediamine. The amount of thixotropic agent required to induce thixotropic properties may depend on the nature of the specific polyurethane and the specific thixotropic agent used. The amount is generally from 1 to 10%, preferably from 2 to 6%, by weight based on the weight of the polyisocyanate (1).

The polyurethane systems are prepared by admixing the polyisocyanate with the polyols. The microballoons and any other optional additives are generally included with the polyols. Generally stoichiometric amounts of polyisocyanate and polyol are utilized, with the possibility of deviating from the stoichiometric amount by utilizing up to about 2% excess polyol.

The seamless master modelling paste prepared in accordance with the present invention contains a relatively uniform distribution of microballoons or hollow microspheres. Hollow microspheres are usually hollow thermoplastic spheres composed of acrylic type resins such as polyacrylonitrile and polymethylmethacrylate, acrylic modified styrene, polyvinylidene chloride, copolymers of styrene and methyl methacrylate, and the like; thermosetting resins such as phenolic resins, epoxy resins, urea resins and the like; or hollow glass, silica, ceramic or carbon spheres that are very light in weight and act as a lightweight filler in the syntactic foam. Thermoplastic microballoons are preferred. Illustrative examples of suitable microballoons include, but are not limited to, Expancel, available from Akzo Nobel Corporation; Phenolic microballoons, available from Asia Pacific microspheres and Matsumoto microspheres available from Yusht-Seiyaku Company. These microballoons preferably have a diameter of about 5 to about 250 micrometers. The microballoons, or hollow microspheres, suitable for use in the invention are conventional in the art and methods for production of these microballoons are well known. Such microballoons are readily available commercially. The microballoons facilitate machining, lead to reduced density and reduce the coefficient of thermal expansion. The surface of the microballoons may be treated suitably for better compatibility with the resin composition.

The microballoons are used in an amount sufficient to produce products of uniform density, but not too much as to lead to difficulty in mixing such than non homogenous products are produced. Suitable amounts are about 50 to 80% by volume, in the final form, preferably about 50% to 70%. The microballoons may be conveniently added with the hardener component, or they may be added with the resin component.

The modelling paste may also contain minor amounts of accelerators and additives conventionally used in the particular application, such as diluents, fillers (such as calcium carbonate), fibers, pigments, dyes, fire retardants, antifoaming agents, wetting agents and polymeric toughening agents. Preferably, the paste additionally includes molecular sieves, which function as moisture scavengers, and are well known to those skilled in the art, examples being zeolites with open-network structures. Preferably, the paste also includes surfactants or antifoaming agents such as a silicone surfactant like Dabco DC 197 Surfactant, available from Air Products, though other products are commercially available and well known to those skilled in the art. It has also been found that the addition of calcium stearate improves the machinability of the cured material and so its addition is also advantageous. These auxiliary materials may be conveniently added with the hardener component, or they may be added with the resin component.

Techniques for dispensing modelling paste are known in the art, eg. by using Tartler Nodopox machinery. The bulk density of the resulting cured articles is usually 0.4 to 0.9 g/cm$^3$, preferably 0.4 to 0.6 g/cm$^3$.

Conveniently, separate tanks are filled with the resin and hardener components. The application of low pressure to the tanks facilitates pumping of the materials. Preferably, pumps deliver the resin and hardener from the tanks to a mix block where the resin and hardener are mixed. The residence time in the mix block, the speed of mechanical stirring and the length of the hose attached to the chamber influence the homogeneity of the mixture.

It is particularly preferred to use low viscosity resin mixtures, with the high level of microballoons, used in this invention: the preferred viscosity range is 1000 to 10,000. Too high a viscosity in the resin results in a need for high pressure pumping to dispense the paste, consequently resulting in broken/damaged microballoons, and thus leading to non-homogenous cured materials.

It is believed that the preferred ratio of the microballoons to resin/thixotrope of 50 to 70% by volume represents the best compromise of achieving a low density machine dispensable paste having sufficient thixotropic hydrogen bonding and inter-particle packing density so that slump is avoided, while at the same time, the cured paste is smooth and has excellent machine and hand cutting qualities.

Machining or cutting can be carried out using conventional tools (e.g. lathe) or cutting machines, such as milling machines, machining centres and the like, in order to achieve the desired shape. The use of a computer numerical control (CNC) machine is preferred. The present invention is therefore suitable for the production of master models, design models, tracing models and prototype tools.

It will be appreciated that the total fabrication cost of a model using the method of the present invention is more economical than a conventional method of using wood or epoxy synthetic foam model blocks. An additional and important advantage is a resulting model surface that is seamless and free of bondlines.

This method is further advantageous in that the amount of syntactic material used in greatly reduced over the conventional method since only a thin layer is dispensed onto the substructure surface. Since syntactic materials are inherently hydroscopic, their moisture absorption causes some dimensional change over time. However, by minimising the amount of syntactic material used, the dimensional change as the result of moisture absorption can be thereby reduced.

In addition to the advantages mentioned above (namely lower and more uniform density, better machinability, smoother surface characteristics, and much greater overall efficiency), the modelling paste used in the present invention exhibits low linear shrinkage and can be used to produce large models that hold high tolerances. The finished article has excellent edge strength, cured shore hardness, flexural strength, heat deflection temperature and compressive strength, as well as a low thermal expansivity.

Figure 2:
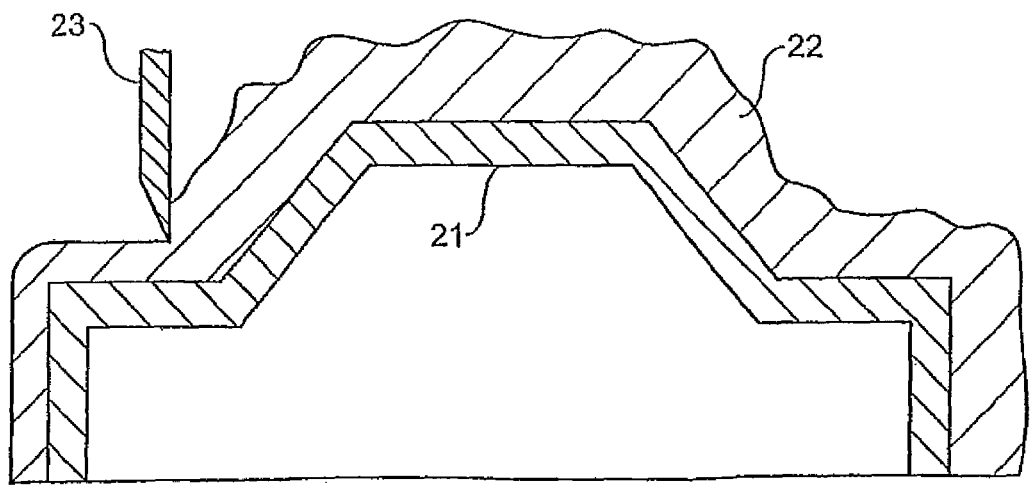

The invention may be carried into practice in various ways and some embodiments will now be described by way of example with reference to the accompanying drawings, in which:

FIG. 1 is a schematic section showing the prior art "building block" modelling method in which multiple boards are glued together then modified in shape; and FIG. 2 is a schematic cross-section through a seamless model free of bond lines produced in accordance with the present invention.

The known prior art modelling system shown in FIG. 1 comprises an undersized support 11 and a series of boards 12 glued together (e.g. at 13) to produce a rough model structure. This is then machined using a cutting tool 14 to form the desired final shape. While the end result is accurate, it has joint lines 15 at the surface.

The system shown in FIG. 2 comprises an undersized support structure 21 which provides a core on to which modelling paste 22 is applied. The support structure 21 may be made from any suitable material such as timber, or synthetic material such as a low density foam material, for example polystyrene, polyurethane or epoxy materials, but in this case is made from polystyrene. The modelling paste 22 is an epoxy.

The paste 22 is mixed and then applied continuously to the support structure 21 at a thickness of about 25 mm. It is then left to cure for about 24 hours, resulting in a crude article. The crude article is shaped to its final contours using a cutter 23 controlled by a CNC machine.

The present invention will now be illustrated by reference to the following non-limiting examples. All parts and percentages are provided on a weight basis unless indicated otherwise.

EXAMPLE 1

This example is directed to the preparation of a suitable low density epoxy modelling paste.

The formulation noted in the Table 1 below is prepared by charging a Tattler Nodopox Machine with the hardener component. A second tank is filled with the epoxy resin component. The hardener system and resin component are delivered to a mix block by a gear pump, with low pressure ($3.512 \times 10^3$ kg/m$^2$ to 7.031 kg/m$^2$) (the pressure on the machine is in bar ~5-15 bar typical) being applied to the tanks to facilitate pumping of the materials. In the mix block, the materials are homogeneously distributed by using a dynamic mixer.

The paste is dispensed onto the substructure at a thickness of between 15 to 50 mm and cured at ambient temperature typically for at least 10 hours. The crude article is shaped to its final contour by use of a Computer Numerical Control (CNC) machine.

The paste is evaluated as follows. The sag resistance of the paste is measured prior to curing by dispensing the paste at a thickness of 15 to 50 mm horizontally on a vertical surface. A measurement of 15 to 50 mm is required, and this method allows evaluation of the degree of sag visually at the different application thicknesses. The density, heat deflection temperature (HDT) of the paste are measured at 25° C. Density is measured in accordance with ASTM

TABLE 1

Formulation 1

| | (pts by weight) |
|---|---|
| Hardener System | |
| Amine adduct (IPDA based) | 63 |
| Non reactive diluent | 15 |
| Thixotrope (fumed silica) | 3 |
| Inorganic fillers | 6 |
| Glass bubbles | 10 |
| Thermoplastic bubbles | 3 |
| Resin component | |
| Epoxy resin | 70 |
| Epoxy diluent | 10 |
| Thixotrope (fumed silica) | 2 |
| Inorganic fillers | 5 |
| Glass bubbles | 10 |
| Thermoplastic bubbles | 3 |
| Properties | |
| Sag resistance | 50 mm OK |
| Density cured | 0.56 g/ml |
| Volume Ratio of Expancel in cured paste | 58% |

The experimental results illustrate the excellent performance characteristics of the pastes prepared. Notably, the paste gives excellent sag resistance properties and low density.

EXAMPLES 2-5 (COMPARATIVE)

The same general procedure of Example 1 is followed, except that the formulations noted in Table 2 below are used. The properties of the pastes so prepared show that these formulations are inferior for the preparation of a seamless modelling paste due to the poor dispensing characteristics as indicated by the low or high resistance to sag of the dispensed paste.

TABLE 2

Comparative formulations (all parts by weight unless indicated)

| | (pts by weight) | | | |
|---|---|---|---|---|
| | 1) P36/ DM50 | 2) LMQ070/ 071 | 3) LMQ070-1/ 071-1 | 4) EE237 |
| Resin % Liquid Matrix | 65 | 86.5 | 80.6 | 78.6 |
| HARDENER | | | | |
| Expancel 551DE | 2.1 | 5.03 | 3.8 | 3.57 |
| QCEL 5028 | 16 | None | 7.0 | 9.16 |
| Talcum | 10.5 | None | 3.1 | 3.28 |
| Calcium Stearate | 2.1 | 4.10 | 3.0 | 1.90 |
| Additives | 4.3 | 1.37 | 1.5 | 1.61 |
| PEI Thixotrope | None | Yes | Yes | Yes |
| IP232 | None | 1.50 | 0.5 | 0.94 |
| Aerosil | None | 1.50 | 0.5 | 0.94 |
| Properties | | | | |
| Density | 0.55/0.44 | 0.48/0.45 | 0.50/0.50 | 0.47/0.50 |
| Consistency | Dry Paste | Wet Paste | Very Wet | Dry |
| Thixotropy | No | Too Much | Not Enough | OK |
| Cracks | No | Yes > 25 mm | (Little) | (Very Little) |
| Thickness | >50 mm | >50 mm | >50 mm | >50 mm |
| Hardness ShoreD (FULLY CURED) | 45 | 37-38 | 40-42 | 38-41 |

EXAMPLE 6

This example is directed to the preparation of a suitable low density polyurethane modelling paste.

The formulation noted in Table 3 below is prepared in the same general manner as in Example 1.

The properties of the polyurethane paste so prepared show that this formulation is suitable for the preparation of a seamless modelling PU paste with fine cell structure and final density of 0.6 g/cm$^3$ with excellent dispensing characteristics, in spite of the high microballoon content. Moreover, there is rapid set up of the high resistance to sag of the dispensed paste. Sag resistance is measured as in Example 1.

| | % |
|---|---|
| Polyol (Density 0.56) | |
| Triol Polyether polyol MW ~400 | 55 |
| Castor oil | 27 |
| Molecular sieves | 1 |
| Mineral filler particle size ~5μ | 8.5 |
| Glass microballoons particle size ~80μ | 2.8 |
| Plastic microballoons particle size ~40μ | 3.5 |
| Colouring paste | 0.1 |
| DETDA | 1.0 to 1.5 |
| Aerosil | 1.0 |
| Antifoam agent | 0.1 |
| | 100.00 |

-continued

|  | % |
|---|---|
| Isocyanate (Density 0.65) | |
| Polymeric MDI NCO cont. 31.5% | 87.00 |
| Plastic coated microballoons | 12.5 |
| Liquid organic thixotropic agent | 0.5 |
|  | 100.00 |
| Mix ratio by weight: 100/73 | |
| Properties | |
| Density | 0.6 gcc3 |
| Sag Resistance | 50 mm |

EXAMPLES 7 AND 8

|  |  | Lab ref: | |
|---|---|---|---|
|  | Description | MC01-18-1 Without acrylic | MC01-28-2 With acrylic |
| Resin | Epoxy resin | 65 | 65 |
|  | Epoxy diluent | 10 | 4 |
|  | Pigments | 2 | 2 |
|  | Acrylate blend | — | 7 |
|  | ATH filler | 13 | 13 |
|  | Fumed silica | 2 | 2 |
|  | Thermoplastic bubbles | 4 | 4 |
| Hardener | Amine adduct | 65 | 65 |
|  | Non reactive diluent | 10 | 10 |
|  | Fumed silica | 1.5 | 1.5 |
|  | Accelerator | 1 | — |
|  | ATH filler | 15 | 15 |
|  | Thermoplastic bubbles | 4 | 4 |
| Hardness gain | Shore D 30 hrs | 15 | 10 |
|  | Shore D 43 hrs | 30 | 28 |
| Peak exotherm (° C.) | EPS tub approx 300 g | 112 | 86 |

This examples illustrates the way in which the presence of an acrylic component serves to control the heat of reaction produced during curing (exotherm). As can be seen, the peak temperature in the formulation including the acrylic was 26 k lower 86° C.) then the peak temperature for the formulation without the acrylic (112° C.).

The invention claimed is:

1. A method of making a seamless model comprising the steps of:
   a) providing at least one tank filled with a resin component and another tank filled with a hardener component;
   b) delivering the resin component and hardener component from the tanks to a mix block and mixing the resin component and hardener component to produce a modelling paste wherein the modelling paste is a low density thixotropic curable paste comprising a resin composition and microballoons;
   c) dispensing the modelling paste onto an outer surface of a support in a continuous layer;
   d) curing the paste at room temperature; and
   e) machining the cured paste to a desired or pre-determined contour to form the seamless model wherein the microballoons are present in an amount of greater than about 50% and less than about 80% of the uncured paste by volume and wherein the density of the uncured paste is in the range of about 0.4 g/cm³ to about 0.9 g/cm³ and wherein the resin composition is a polyurethane composition comprising:
   (i) an organic polyisocyanate component;
   (ii) a polyol component comprising greater than about 50% by weight of a high molecular weight polyol and less than about 50% by weight of a low molecular weight amine-based polyol; and
   (iii) a chemical thixotropic agent.

2. The method of claim 1 wherein the thixotropic agent is selected from the group consisting of: a hydrogen-bonding type of thixotropic agent present in an amount of about 0.2% to about 4% by weight of the paste; and a chemical thixotropic agent present in an amount of about 0.05% to about 1.5% by weight of the paste.

3. The method of claim 1 wherein the paste further comprises a filler in an amount of about 1% to about 30% by weight of the paste.

4. The method of claim 1 wherein the chemical thixotropic agent is selected from the group consisting of: 4,4'-methylenedianiline; m-phenylenediamine; 4,4'-methylenebis(2-ethylbenzeneamine); isophoronediamine; and diethyltoluenediamine.

5. The method of claim 4 wherein the organic polyisocyanate component is selected from the group consisting of: polymethylene polyphenyl isocyanate; 4,4'-diphenylmethane diisocyanate; hexamethylene diisocyanate; isophorone diisocyanate; 2,2,4-trimethylhexamethylene diisocyanate; polymeric 4,4'-diphenylmethane diisocyanate; and a mixture thereof.

6. The method of claim 5 wherein the low molecular weight amine-based polyol is an amine-based triol and the high molecular weight polyol is a polyether triol.

7. A low density thixotropic seamless modelling paste having a density of about 0.4 g/cm³ to about 0.6 g/cm³ comprising a resin composition and microballoons wherein the resin composition is a polyurethane comprising:
   (i) an organic polyisocyanate component;
   (ii) a polyol component comprising greater than about 50% by weight of a high molecular weight polyol and a low mecular weight amine-based polyol; and
   (iii) a chemical thixotropic agent and
   wherein the microballoons are present in an amount greater than about 50% to less than about 80% of the paste by volume.

8. The low density paste of claim 7 further comprising a filler present in an amount of about 1% to about 30% by weight of the paste.

9. The low density paste of claim 7 wherein the organic polyisocyanate component is selected from the group consisting of: polymethylene polyphenyl isocyanate; 4,4'-diphenylmethane diisocyanate; hexamethylene diisocyanate; isophorone diisocyanate; 2,2,4-trimethylhexamethylene diisocyanate; polymeric 4,4'-diphenylmethane diisocyanate; and a mixture thereof.

10. The low density paste of claim 7 wherein the high molecular weight polyol is a polyether triol and the low molecular weight amine-based polyol is an amine-based triol.

11. The low density paste of claim 7 wherein the chemical thixotropic agent is selected from the group consisting of 4,4'-dimethylenedianiline; m-phenylenediamine; 4,4'-methylenebis(2-ethylberizeneamine); isophoronediamine; and diethyltoluenediamine.

12. The low density paste of claim 7 further comprising at least one molecular sieve, surfactant, foaming agent or calcium stearate.

* * * * *